United States Patent
Baumann et al.

(10) Patent No.: US 8,002,088 B2
(45) Date of Patent: Aug. 23, 2011

(54) SELF BOOSTING ELECTROMECHANICAL FRICTION BRAKE

(75) Inventors: Dietmar Baumann, Hemmingen (DE); Dirk Hofmann, Stuttgart (DE); Herbert Vollert, Vaihingen/Enz (DE); Willi Nagel, Remseck/Hochdorf (DE); Andreas Henke, Diemelstadt (DE); Bertram Foitzik, Ludwigsburg (DE); Bernd Goetzelmann, Sindelfingen (DE)

(73) Assignee: Robert Bosch GmbH, Stuttgart (DE)

( * ) Notice: Subject to any disclaimer, the term of this patent is extended or adjusted under 35 U.S.C. 154(b) by 1252 days.

(21) Appl. No.: 11/628,263

(22) PCT Filed: Apr. 28, 2005

(86) PCT No.: PCT/EP2005/051922
§ 371 (c)(1),
(2), (4) Date: Dec. 1, 2006

(87) PCT Pub. No.: WO2005/124181
PCT Pub. Date: Dec. 29, 2005

(65) Prior Publication Data
US 2008/0011559 A1    Jan. 17, 2008

(30) Foreign Application Priority Data
Jun. 19, 2004  (DE) .......................... 10 2004 029 841

(51) Int. Cl.
*F16D 55/08* (2006.01)
(52) U.S. Cl. ...................... 188/72.7; 188/72.2; 188/70 B
(58) Field of Classification Search .............. 188/70 B, 188/72, 342, 72.2, 72.7; 192/52.5, 53.31
See application file for complete search history.

(56) References Cited

U.S. PATENT DOCUMENTS

| | | | | |
|---|---|---|---|---|
| 1,840,032 A | * | 1/1932 | Greenwood | 188/324 |
| 3,216,532 A | * | 11/1965 | Erickson et al. | 188/342 |
| 3,422,934 A | * | 1/1969 | Hambling | 188/72.2 |
| 4,732,240 A | * | 3/1988 | Flaim | 188/78 |
| 6,318,513 B1 | * | 11/2001 | Dietrich et al. | 188/72.7 |
| 6,752,247 B2 | * | 6/2004 | Hartsock | 188/72.7 |
| 2003/0217897 A1 | | 11/2003 | Halasy-Wimmer et al. | |

FOREIGN PATENT DOCUMENTS

| | | |
|---|---|---|
| DE | 102 23 389 A1 | 12/2003 |
| DE | 102 26 035 A1 | 12/2003 |
| DE | 102 30 008 A1 | 1/2004 |
| GB | 1063073 | 3/1967 |
| JP | 08210395 A * | 8/1996 |
| JP | 1182580 A | 3/1999 |
| JP | 11159549 A | 6/1999 |
| JP | 2003222168 A | 8/2003 |

* cited by examiner

Primary Examiner — Bradley T King
(74) Attorney, Agent, or Firm — Ronald E. Greigg

(57) ABSTRACT

A self-boosting electromechanical friction brake for a motor vehicle in which, with an electromechanical actuator, a friction brake lining can be pressed against a brake disk, and the friction brake lining is braced in the brake caliper via a wedge mechanism, which effects a self boosting. A friction brake lining which is pressed by the actuator has with a lower coefficient of friction, and in particular with less relative fluctuation in the coefficient of friction, than another friction brake lining positioned fixedly in the brake caliper. An operation-dictated fluctuation in the coefficient of friction and thus a change in the self boosting is reduced, and as a result the disk brake, with a low coefficient of friction, can be actuated with less actuation force and less actuation energy.

4 Claims, 3 Drawing Sheets

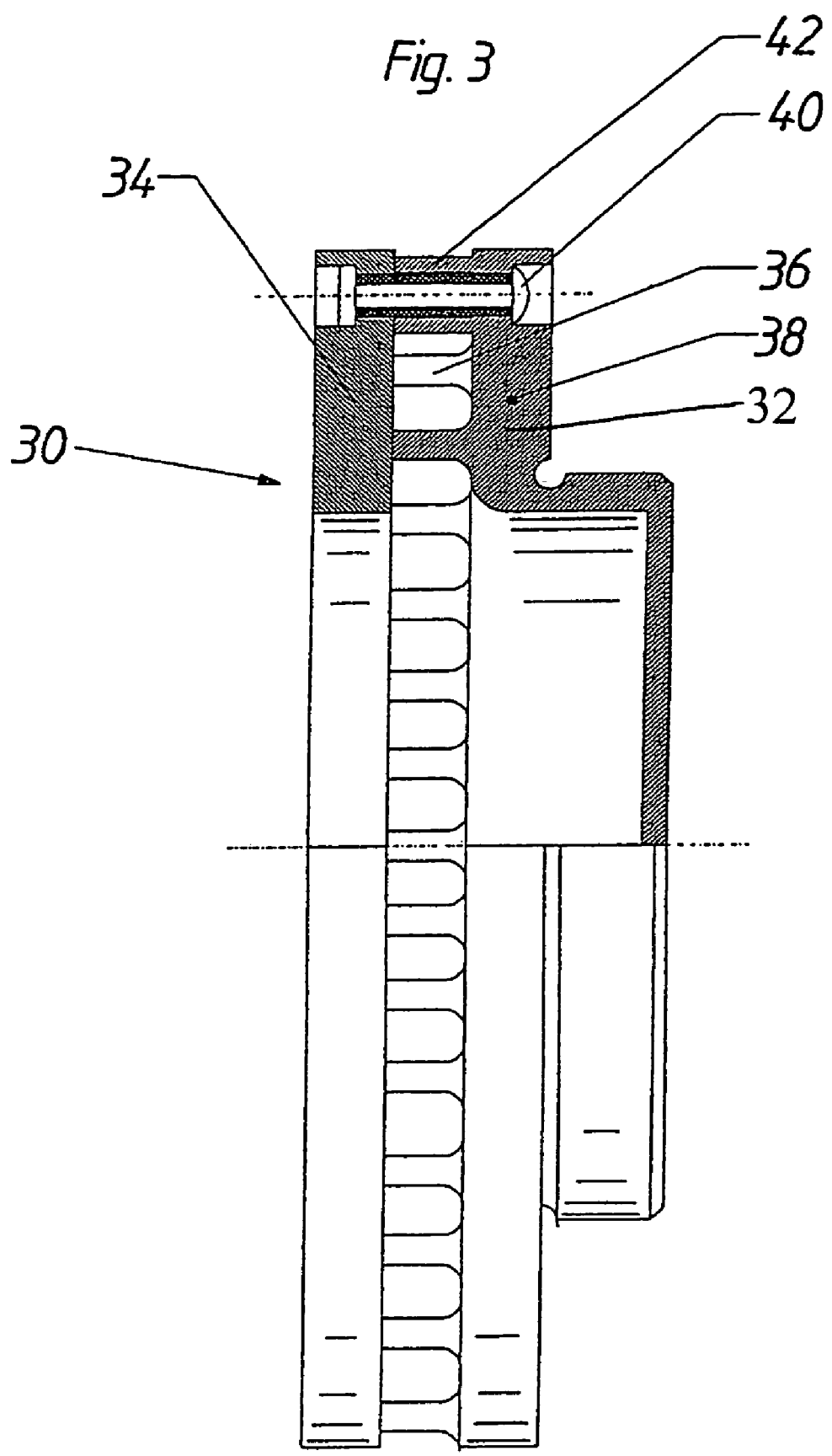

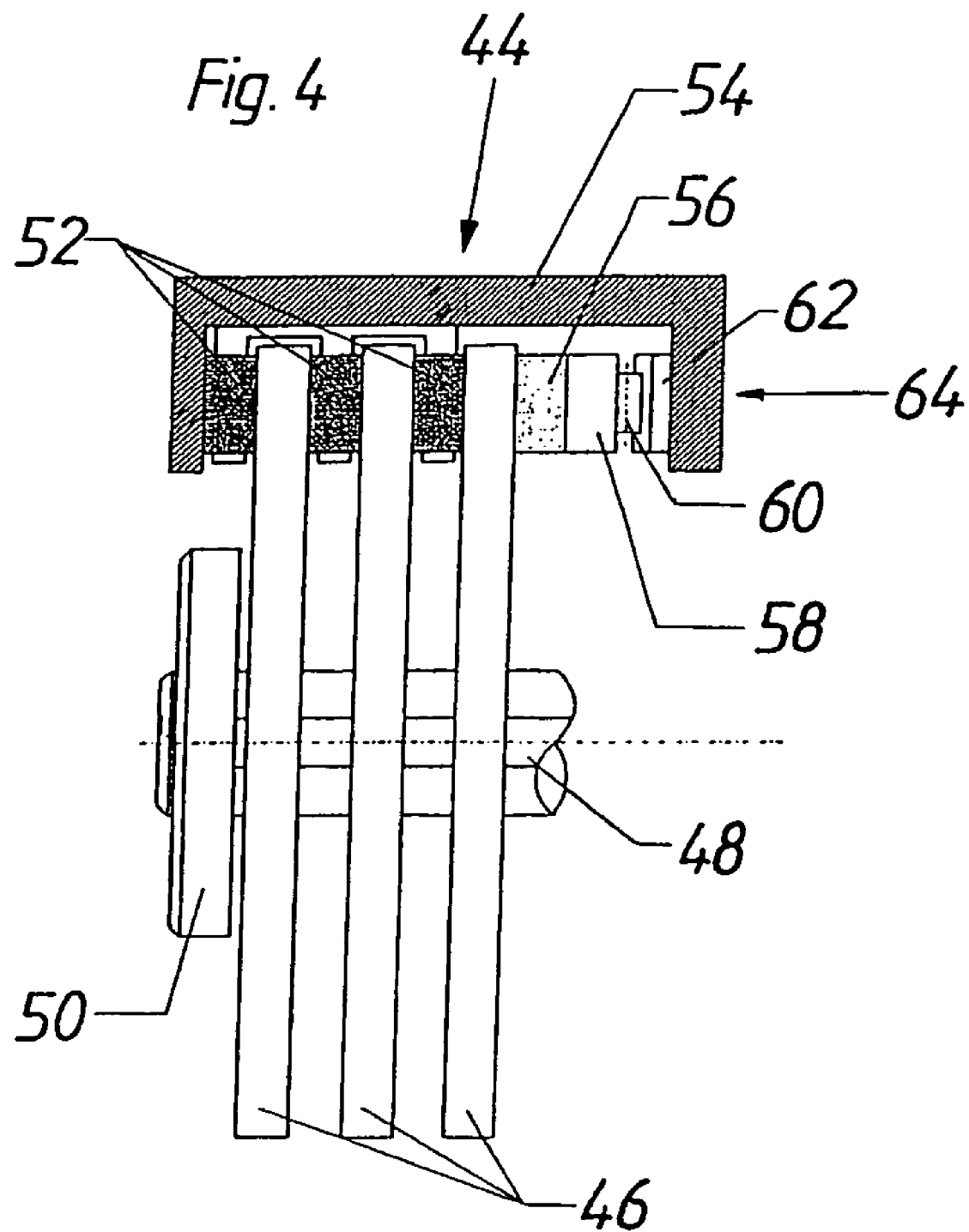

SELF BOOSTING ELECTROMECHANICAL FRICTION BRAKE

CROSS-REFERENCE TO RELATED APPLICATIONS

This application is a 35 USC 371 application of PCT/EP 2005/051922 filed on Apr. 28, 2005.

BACKGROUND OF THE INVENTION

1. Field of the Invention

The invention relates to an improved self-boosting electromechanical friction brake for a motor vehicle.

2. Description of the Prior Art

The invention is explained below in terms of a disk brake, because known friction brakes of this generic type are typically disk brakes, and because the invention can be explained clearly in terms of a disk brake. However, the invention is not limited to this type of brake.

Known electromechanical friction brakes have a friction brake lining, which for braking can be pressed by an electromechanical actuator against a brake body. In the case of a disk brake, the brake body is a brake disk. The actuator typically has an electric motor and a rotation-to-translation conversion gear, which converts a rotary driving motion of the electric motor into a translational motion for pressing the friction brake lining against the brake body. A step-down gear, such as a planetary gear, is often interposed between the electric motor and the rotation-to-translation conversion gear. As rotation-to-translation conversion gears, helical gears are known; because there is less friction, rolling threaded drives such as roller threaded drives are preferably used. However, a rotatable cam can also be used, for instance, as the rotation-to-translation conversion gear for converting the rotating driving motion of the electric motor or of the step-down gear into a translational motion for pressing the friction brake lining against the brake body.

Electromechanical disk brakes moreover have a further friction brake lining, which is pressed against the brake body by a reaction force, which is caused by the pressing of the one friction brake lining against the brake body. For generating the reaction force, so-called floating calipers are known, in which the friction brake linings are placed on both sides of a brake disk. The floating caliper is supported displaceably transversely to the brake disk. When the one friction brake lining is pressed by the actuator against the one side of the brake disk, the floating caliper is displaced transversely to the brake disk and presses the further friction brake lining against the other side of the brake disk.

To attain a self boosting, in known electromechanical disk brakes, self-boosting devices with a wedge mechanism are used. In them, a friction brake lining is movable in the rotary or circumferential direction of the brake disk and has a wedge on a side facing away from the brake disk. Via the wedge, the friction brake lining is braced on a counterpart wedge face in the brake caliper, which forms an abutment for the wedge. If the friction brake lining is pressed for braking against the brake disk, the latter exerts a frictional force in the direction of rotation of the brake disk on the friction brake lining, which urges the latter in the direction of an increasingly narrower wedge gap between the counterpart wedge face and the brake disk. Because of the wedge principle, the wedge mechanism exerts a force on the friction brake lining that has a component that is transverse to the brake disk. This transverse component forms a contact pressure, which presses the friction brake lining against the brake disk in addition to a contact pressure exerted by the actuator. As a result, the braking force is boosted. The self-boosting device converts the frictional force, exerted by the rotating brake disk against the friction brake lining pressed against it, into the additional contact pressure. The wedge mechanism may have a wedge angle that is either constant or varying over a displacement travel of the friction brake lining, and as a result the self boosting is either constant or varies with the displacement of the friction brake lining. The wedge mechanism is a mechanical self-boosting device. As a mechanical self-boosting device, a lever mechanism is for instance also known, in which the friction brake lining, on being pressed against the brake body, is braced via an obliquely positioned lever stressed for tension or pressure and as a result brings about the self boosting. A support angle at which the lever supports the friction brake lining obliquely to the brake disk corresponds to the wedge angle of the wedge mechanism. Nonmechanical self-boosting devices are also possible, such as a hydraulic self-boosting device. Typically, the self-boosting device acts on the friction brake lining that is acted upon by the actuator, but this is not compulsory; the self-boosting device may also act on a friction brake lining not acted upon by the actuator.

A coefficient of friction between the friction brake lining and the brake body varies with operating conditions, such as a rotary speed of the brake body or in other words a relative speed between the brake body and the friction brake lining, the temperature, soiling, and wetness; at a constant actuation force of the actuator, the contact pressure exerted by the self-boosting device of the friction brake lining against the brake body, and thus a braking force or braking moment, therefore also vary to the same extent. As a consequence, at a low coefficient of friction resulting from a fluctuation in the coefficient of friction, a major actuation force and thus high actuation energy must be exerted by the actuator in order to generate a defined braking force. To overcome this problem, a self-boosting device with a wedge mechanism with an adjustable wedge angle, that is, a settable self boosting, has been proposed. The present invention discloses a different course.

SUMMARY AND ADVANTAGES OF THE INVENTION

The friction brake of the invention provides that the friction brake lining, which is pressed by the self-boosting device against the brake body, has less fluctuation in the coefficient of friction than the other friction brake lining. Less fluctuation in the coefficient of friction is attainable by using a different material for the friction brake lining, in particular by means of a material that has a lower coefficient of friction with the brake body than the other friction brake lining that is not (directly) acted upon by the self-boosting device. Friction brake linings with a lower coefficient of friction typically also have less fluctuation in the coefficient of friction in operation; not only the absolute fluctuation but also the relative fluctuation in the coefficient of friction, or in other words the fluctuation referred to an absolute coefficient of friction, are less than in friction brake linings with a higher coefficient of friction. As the absolute coefficient of friction, a mean value of the coefficients of friction that occur in operation can for instance be chosen. Because of the lesser (relative) fluctuation in the coefficient of friction of the friction brake lining that is pressed by the self-boosting device against the brake body, the fluctuation in the contact pressure exerted by the self-boosting device on the friction brake lining lessens, and the self boosting and the braking force of the friction brake fluctuate less. The actuation force to be exerted by the actuator for generating a certain braking force varies less between the least and highest coefficient of friction of the friction brake lining; the friction brake can therefore be designed such that the actuation force and actuation energy to be exerted by the actuator at the least coefficient of friction are less. A lower absolute coefficient of friction between the friction brake lining, pressed against the brake body by the self-boosting device, and the brake body itself can be compensated for by means of a higher self boosting, for instance by a more-acute wedge angle of a wedge mechanism of the self-boosting device, and therefore does not require a higher actuation force of the actuator. For the friction brake lining pressed against the brake body by the self-boosting device, even a friction brake lining with a very low coefficient of friction can therefore be selected, whose essential task is to generate the contact pressure by the self-boosting device and whose task is not so much to attain a high braking force. The braking force can be attained essentially by the other friction brake lining, which has a higher coefficient of friction. The choice of material for the friction brake lining pressed against the brake body by the self-boosting device is thus relatively free and in any case is not restricted by the choice of a material having a high coefficient of friction.

Advantageous features and refinements of the invention are disclosed. One feature provides that the friction brake lining that is pressed against the brake body by the self-boosting device has different friction materials. The reason for this is that friction brake linings exist whose coefficient of friction increases at a high specific capacity (for instance in the case of fading) and/or increasing temperature, and that other materials exist whose coefficient of friction decreases in the same loading case and/or at increasing temperature. In general, it can be stated that friction materials exist whose coefficients of friction vary oppositely when one or more operating parameters change. By combining two (or more) friction materials with an opposite change in coefficient of friction, the total (relative) fluctuation in the coefficient of friction can be reduced. In particular, a reduction in the fluctuation in the coefficient of friction of the friction brake lining, pressed against the brake body by the self-boosting device, when the temperature changes is sought. Thus a varying self boosting at an increasing braking temperature under conditions of repeated or lengthy braking is reduced; in the ideal case, a temperature-independent self boosting is attained. Since the opposed temperature dependencies of the coefficients of friction of different friction materials can differ in amount, it may be necessary for the friction materials of the friction brake lining to occupy faces of different sizes, in order to come as close as possible to the ideal temperature independence or the independence from other operating parameters, and optionally a weighted mixture of a plurality of operating parameters as well.

Since the coefficient of friction and the fluctuation in the coefficient of friction are dependent not solely on the friction brake lining but also on the brake body, then to attain a low (relative) fluctuation in the coefficient of friction, a brake body can also be selected whose friction face that cooperates with the friction brake lining which is pressed against the brake body by the self-boosting device has a different coefficient of friction, with less fluctuation in the coefficient of friction, together with this friction brake lining than the friction face, cooperating with the other friction brake lining, of the brake body. As the brake body, a brake disk can for instance be selected whose one side is coated or treated in some other way in order to attain the desired, lesser fluctuation in the coefficient of friction. A brake disk that is ventilated on the inside, with different materials on the two sides of the brake disk, is also possible as an example.

The invention may be employed in a multi-disk brake. A multi-disk brake has a number of disks, fixed against relative rotation to one another, instead of a single brake disk. This embodiment makes it possible to use a friction brake lining which is pressed by the self-boosting device against one of the disks and which has the desired low fluctuation in the coefficient of friction and to use a number of different friction brake linings of a different material, which serve essentially to generate the braking force. A disk of a different material, or a disk coated or treated in some other way, may also be selected, against which the one friction brake lining is pressed by the self-boosting device, while the other disks of the multi-disk brake comprise a different material.

BRIEF DESCRIPTION OF THE DRAWINGS

The invention is described in further detail below in conjunction with the drawings, in which:

FIG. 3, a brake disk for a friction brake of invention; and

FIG. 4, a schematic illustration of a second exemplary embodiment of the friction brake of the invention.

DESCRIPTION OF THE PREFERRED EMBODIMENTS

Figure 1:
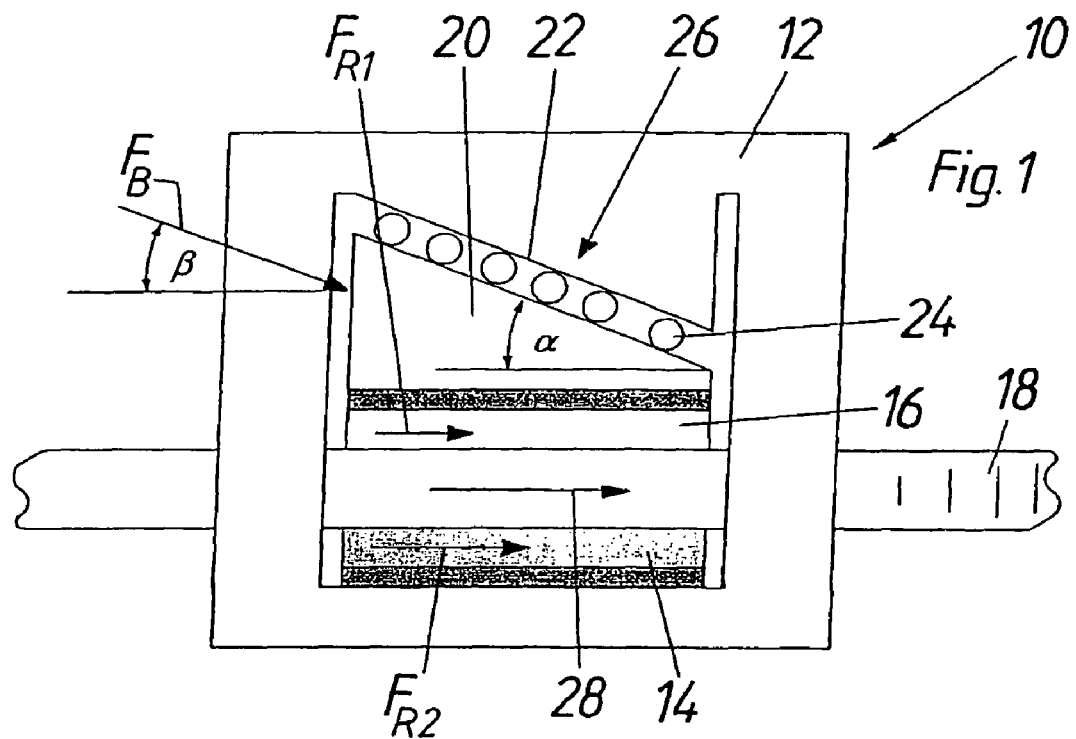
FIG. 1 is a schematic illustration of a first exemplary embodiment of the invention.

The self-boosting electromechanical friction brake of the invention shown in FIG. 1 is embodied as a disk brake 10. The disk brake 10 has a brake caliper 12, in which there are two friction brake linings 14, 16, one on each side of a brake disk 18. The brake caliper 12 is embodied as a so-called floating caliper; that is, it is guided displaceably transversely to the brake disk 18. If one of the two friction brake linings 16 is pressed for braking against the brake disk 18 with a contact pressure, then a reaction force to the contact pressure causes a displacement of the brake caliper 12 transversely to the brake disk 18 and as a result presses the other friction brake lining 14 against the other side of the brake disk 18. This is known per se and therefore need not be explained further here. The disk brake 10 is intended for use in a motor vehicle, not shown; the brake disk 18 is connected to a vehicle wheel in a manner fixed against relative rotation.

One of the two friction brake linings 14 is placed fixedly, that is, immovably, in the brake caliper 12. The other friction brake lining 16 is movable in the circumferential direction and transversely to the brake disk 18. The movable friction brake lining 16, on a back side facing away from the brake disk 18, has a wedge 20, by way of which it is braced against a counterpart wedge face 22 of the brake caliper 12. To reduce friction, the wedge 20 is roller-supported with rollers 24 on the counterpart wedge face 22. The wedge 20 and the counterpart wedge face 22 extend obliquely to the brake disk 18 at a wedge angle α.

The wedge 20 and the counterpart wedge face 22 form a mechanical self-boosting device 26 of the disk brake 10: If the movable friction brake lining 16 is pressed for braking against the brake disk 18, the rotating brake disk 18 exerts a frictional force $F_{R1}$ in the direction of rotation on the friction brake lining 16. The frictional force $F_{R1}$ is oriented in the direction of an increasingly narrower wedge gap between the counterpart wedge face 22 and the brake disk 18. A rotation of the brake disk 18 is assumed in the direction of the arrow 28 for the purposes of the description that follows. Because of the wedge principle, the counterpart wedge face 22 exerts a bracing force on the wedge 20 and thus on the movable friction brake lining 16, which has a force component transverse to the brake disk 18. This force component transverse to the brake disk 18 is a contact pressure in addition to a contact pressure exerted on the friction brake lining 16 by an actuator to be explained hereinafter. It causes a self boosting of the braking force.

For actuation, the disk brake 10 has an electromechanical actuator, not shown, which is known per se and will therefore not be explained further here. The electromechanical actuator exerts an actuation force $F_B$ on the movable friction brake lining 16 and the wedge 20, which acts at an angle β on the friction brake lining 16 and wedge 20. From the standpoint of a low actuation force $F_B$, it is favorable if the actuation force $F_B$ acts on the friction brake lining 16 and wedge 20 at an angle β that is equivalent to the wedge angle α. However, this is not compulsory; the actuation force $F_B$ may also act on the friction brake lining 16 and the wedge 20 at a different angle or for instance also transversely to the brake disk 18. The actuation force $F_B$ displaces the friction brake lining 16 with the wedge 20 parallel to the counterpart wedge face 22, or in other words obliquely to the brake disk 18 at the wedge angle α in the direction of rotation 28 of the brake disk, in the direction of the increasingly narrower wedge gap between the counterpart wedge face 22 and the brake disk 18. As a result, the friction brake lining 16 is pressed against the brake disk 18; the resultant frictional force $F_{R1}$ between the brake disk 18 and the friction brake lining 16 brings about the self boosting of the disk brake in the manner described above, by means of the self-boosting device 26.

In the disk brake 10 of the invention, the two friction brake linings 14, 16 comprise different materials with different coefficients of friction. The movable friction brake lining 16 pressed against the brake disk 18 in braking by the self-boosting device 26 has less fluctuation in the coefficient of friction than the fixed friction brake lining 14. This is attained in this exemplary embodiment by a friction brake lining 16 with a lower coefficient of friction. The lower coefficient of friction of the movable friction brake lining 16 is represented in FIG. 1 by the shorter frictional force arrow $F_{R1}$ in comparison to the frictional force arrow $F_{R2}$ of the fixed friction brake lining 14. It is important that a relative fluctuation in the coefficient of friction of the friction brake lining 16, pressed against the brake disk in braking by the self-boosting device 26, is low; that is, the fluctuation, referred to an absolute coefficient of friction, in the coefficient of friction, is low, being for instance a mean value of all the coefficients of friction of the friction brake lining 16 that occur in operation. The coefficient of friction between the friction brake lining 16 and the brake disk 18 is not constant; instead, it is dependent on operating conditions, such as the relative speed between the brake disk 18 and the friction brake lining 16, the temperature, dirt, and wetness. Because of the reduced relative fluctuation in the coefficient of friction between the movable friction brake lining 16, pressed against the brake disk 18 by the self-boosting device 26 in braking, and the brake disk 18, the fluctuation in the contact pressure of the friction brake lining 16 against the brake disk 18 exerted by the self-boosting device 26, and thus a fluctuation in the braking force, are reduced. The lower coefficient of friction can be compensated for by a more-acute wedge angle α, that is, a greater self boosting of the self-boosting device 26. Because of the lesser fluctuation in the coefficient of friction, a desired braking force, at an operationally dictated low coefficient of friction, can be generated between the friction brake lining 16 and the brake disk 18 with less actuation force $F_B$ and thus with less actuation energy. The actuator, not shown, of the disk brake 10 can therefore be made smaller and lighter in weight.

Figure 2:
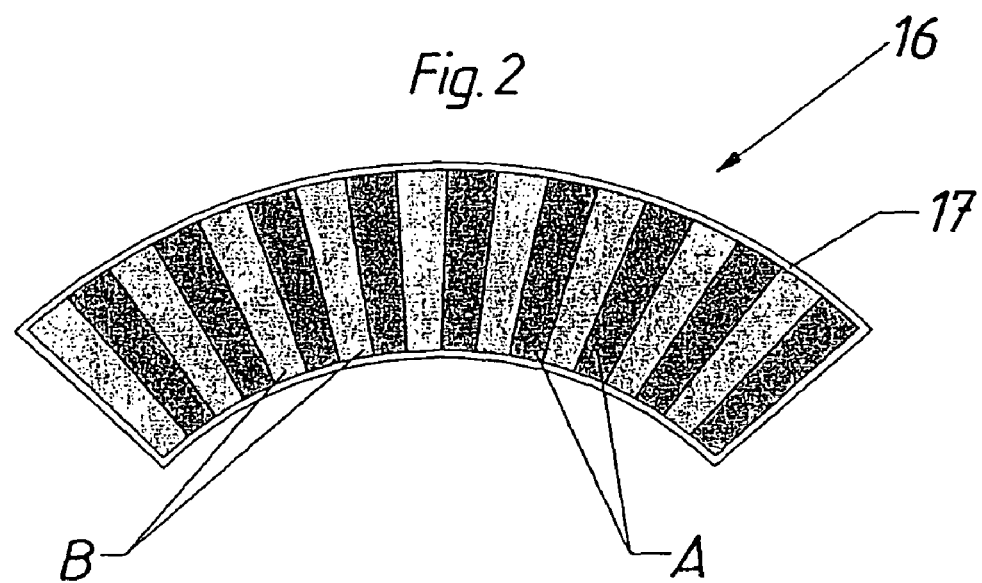
FIG. 2, a friction brake lining for the friction brake of the invention.

FIG. 2 shows an exemplary embodiment according to the invention of the movable friction brake lining 16 of the disk brake 10, which in braking is pressed against the brake disk 18 by the self-boosting device 26. The friction brake lining 16, as usual, has a lining holder plate 17, on which, in the invention, different friction materials A, B are mounted. The friction materials A, B have coefficients of friction which vary oppositely as a function of one or more operating parameters of the disk brake 10; that is, if the operating parameter or parameters varies, the coefficient of friction of the one friction material, such as A, increases, while the coefficient of friction of the other friction material, such as B, decreases. As a result, the change in coefficient of friction of the friction brake lining 16 upon a change in the operating parameter or parameters of the disk brake 10 is reduced overall; in the ideal case, the changes in coefficient of friction of the friction materials A, B compensate for one another, and the total coefficient of friction of the movable friction brake lining 16 remains constant under changing operating parameters. In the ideal case, the total coefficient of friction of the movable friction brake lining 16 is accordingly independent of one or more operating parameters of the disk brake 10. As a result, a change in the magnitude of the self boosting of the disk brake 10 is lessened under changing operating parameters, since the magnitude of the self boosting is linearly dependent on the coefficient of friction of the movable friction brake lining 16. Ideally, the self boosting is constant and independent of one or more operating parameters.

In particular, the coefficients of friction of the friction materials A, B of the movable friction brake lining 16 vary oppositely as a function of temperature, in order to compensate for increasing brake temperatures in the event of lengthy, repeated braking actions.

In the exemplary embodiment shown of the friction brake lining 16, the friction materials A, B are located in alternation in circular-annular segments on the lining holder 17. Other distributions are possible; for instance, each of the friction materials A, B may occupy one-half of the lining holder 17, or else one friction material A may occupy a middle region while the other friction material B occupies both end regions, or both friction materials A, B may occupy various fields of the lining holder (not shown). The faces occupied by the friction materials A, B may also be of various sizes, especially if the dependencies of their coefficients of friction on the operating parameter or parameters are of different magnitudes quantitatively.

FIG. 3 shows a brake disk 30 for a disk brake of the invention that can be used instead of the brake disk 18 shown in FIG. 1. The brake disk 30 shown in FIG. 3 is an internally ventilated double brake disk, with two rigidly joined-together brake disks 32, 34 that are kept spaced apart by cooling fins 36. Friction faces each form only outer faces, facing away from one another, of the two brake disks 32, 34. By means of a different choice of materials for the two brake disks 32, 34 that form the internally ventilated brake disk 30, the different coefficients of friction and different fluctuations in the coefficient of friction provided according to the invention are attained on both sides of the brake disk 30. The brake disks 32, which in the exemplary embodiment of the invention shown and described has a cup-shaped hub 38 and the ribs 36, comprise gray cast iron while other brake disk 34 is an annular disk, for instance of special steel or of a ceramic material. It has less relative fluctuation in the coefficient of friction than the gray cast iron brake disk 32. The two brake disks 32, 34 are joined together with rivets 40 and centered on one another by clamping sleeves 42.

Instead of one brake disk 34 of a different material, one of the two brake disks may also be coated or treated in some other way in order to attain the desired lesser relative fluctuation in the coefficient of friction. Also, one side of a brake disk that is not internally ventilated may have such a coating or other treatment.

The brake disk 30 and the brake caliper 12 are located relative to one another such that the side of the brake disk 30 that has the lesser relative fluctuation in the coefficient of friction faces toward the friction brake lining 16, on which the self-boosting device 26 acts. A brake disk 30 with different coefficients of friction and different fluctuations in the coefficient of friction on both sides makes it possible to use friction brake linings 14, 16 of the same material. Since the coefficient of friction and the fluctuation in the coefficient of friction depend on the pairing of material for the brake disk 30 and the friction brake lining 14, 16, a brake disk 30 with different materials on both sides and two friction brake linings 14, 16 of different materials may also be used in the disk brake 10 of the invention.

FIG. 4 shows a multi-disk brake 44 of the invention, with three disks 46, which are received axially displaceably and, by positive engagement, in a manner fixed against relative rotation on a brake shaft 48. The brake shaft 48 has a flange 50, rigidly joined to it, for securing a vehicle wheel, not shown. The disks 46 may be conceived of as brake disks. Between the disks 46 and on an outer side of the disks 46, friction brake linings 52 are located in a brake caliper 54. These friction brake linings 52 are axially parallel to the brake shaft 48, and thus are guided displaceably transversely to the disks 46 in the brake caliper 54 and are immovable in the circumferential direction of the disks 46. On the other outer side of the disks 46, there is a friction brake lining 56 in the brake caliper 54, which corresponds to the movable friction brake lining 16 of the disk brake 10 of FIG. 1. This friction brake lining 56, on a back side facing away from the disks 46, has a wedge 58, which is braced, roller-borne via rollers 60, on a counterpart wedge 62 in the brake caliper 54. The wedge 58, the rollers 60, and the counterpart wedge 62 of the multi-disk brake 44 of FIG. 4 correspond to the wedge 20, rollers 24, and counterpart wedge face 22 of the disk brake 10 of FIG. 1; for explanation of FIG. 4, to avoid repetition, see the applicable descriptions of FIG. 1. The wedge 58 and the counterpart wedge 62 form a self-boosting device 64, which corresponds to the self-boosting device 26 of the disk brake 10 of FIG. 1 and functions in the same way. For actuation, the multi-disk brake 44, like the disk brake 10 of FIG. 1, has an electromechanical actuator, not shown, which displaces the friction brake lining 56 and the wedge 58 in the circumferential direction of the disks 46, that is, at the wedge angle, obliquely toward the disks 46. In the case of the multi-disk brake 44 of FIG. 4 as well, the friction brake lining 56, which is acted upon by the self-boosting device 64, comprises a material with a lower coefficient of friction, and in particular less relative fluctuation in the coefficient of friction, than the further friction brake linings 52. Also, as described per se for FIG. 3, the disk 46 against which the friction brake lining 56 that is acted upon by the self-boosting device 64 is pressed can comprise a different material from the other disks 46 or may have a coated or otherwise treated friction face on its side toward the friction brake lining 56, in order to attain the low relative fluctuation in the coefficient of friction, desired according to the invention, of the friction brake lining 56 acted upon by the self-boosting device 64. Particularly in the case of a multi-disk brake 44, a low coefficient of friction of the friction brake lining 56 acted upon by the self-boosting device 64 is unproblematic, because the other friction brake linings 52 generate a sufficiently strong braking force without difficulty.

The foregoing relates to a preferred exemplary embodiment of the invention, it being understood that other variants and embodiments thereof are possible within the spirit and scope of the invention, the latter being defined by the appended claims.

The invention claimed is:

1. A self-boosting electromechanical friction brake for a motor vehicle, said friction brake comprising:
   a first friction brake lining,
   an electromechanical actuator with which the friction brake lining can be pressed for braking against a brake body,
   a second friction brake lining which is pressed against the brake body by a reaction force that is caused by the pressing of the one friction brake lining against the brake body, and
   a self-boosting device, which converts a frictional force, exerted upon braking by the rotating brake body on one of the friction brake linings pressed against it, into a contact pressure which presses the friction brake lining against the brake body,
   wherein the self-boosting device includes a wedge supported on a counterpart wedge face,
   wherein the first friction brake lining is supported on said wedge,
   wherein said first friction brake lining is movable in a circumferential direction and transverse to the brake body,
   wherein the friction brake lining that can be pressed against the brake body by the self-boosting device has less fluctuation in the coefficient of friction with the brake body than the other friction brake linings, and
   wherein the friction brake further comprises a brake disk of the brake body having a first friction face cooperating with the friction brake lining that can be pressed against the brake body by the self-boosting device, which first friction face has a different coefficient of friction from friction faces that cooperate with the other friction brake lining or friction brake linings.

2. The friction brake in accordance with claim 1, wherein said first friction face has a lower coefficient of friction than friction faces that cooperate with the other friction brake lining or friction brake linings.

3. A self-boosting electromechanical friction brake for a motor vehicle, said friction brake comprising:
   a first friction brake lining,
   an electromechanical actuator with which the friction brake lining can be pressed for braking against a brake body,
   a second friction brake lining which is pressed against the brake body by a reaction force that is caused by the pressing of the one friction brake lining against the brake body,
   a self-boosting device, which converts a frictional force, exerted upon braking by the rotating brake body on one of the friction brake linings pressed against it, into a contact pressure which presses the friction brake lining against the brake body,
   wherein the self-boosting device includes a wedge supported on a counterpart wedge face,
   wherein the first friction brake lining is supported on said wedge, wherein said first friction brake lining is movable in a circumferential direction and transverse to the brake body, wherein the friction brake lining that can be pressed against the brake body by the self-boosting device has less fluctuation in the coefficient of friction with the brake body than the other friction brake linings, wherein the friction brake is a disc brake, and wherein the disk brake has a brake disk with friction faces of different materials on both of its sides.

4. A self-boosting electromechanical friction brake for a motor vehicle, said friction brake comprising:

a first friction brake lining, an electromechanical actuator with which the friction brake lining can be pressed for braking against a brake body, a second friction brake lining which is pressed against the brake body by a reaction force that is caused by the pressing of the one friction brake lining against the brake body, and a self-boosting device, which converts a frictional force, exerted upon braking by the rotating brake body on one of the friction brake linings pressed against it, into a contact pressure which presses the friction brake lining against the brake body, wherein the self-boosting device includes a wedge supported on a counterpart wedge face, wherein the first friction brake lining is supported on said wedge, wherein said first friction brake lining is movable in a circumferential direction and transverse to the brake body, wherein the friction brake lining that can be pressed against the brake body by the self-boosting device has less fluctuation in the coefficient of friction with the brake body than the other friction brake linings, and wherein the first friction brake lining comprises two different friction materials whose coefficients of friction vary oppositely as a function of one or more operating parameters.

* * * * *